Patented Sept. 1, 1942

2,294,590

UNITED STATES PATENT OFFICE 2,294,590

ALKYD RESINS COMBINED WITH AMINO-TRIAZINE-ALDEHYDE RESINS

Herbert John West, Riverside, Conn., assignor to American Cyanamid Company, New York, N. Y., a corporation of Maine No Drawing. Application February 18, 1939, Serial No. 257,101

12 Claims. (Cl. 260—42)

This invention relates to a new class of synthetic resins which are homogeneous dispersions of aminotriazine-aldehyde resins in unmodified or modified resins of the alkyd type. The invention includes the resins themselves, their methods of manufacture, and new and improved coating compositions prepared therefrom. The invention also includes articles coated with such coating compositions.

It has previously been shown that the heat resistance, gloss and color retention of alkyd resin compositions are greatly improved by incorporating triazine-aldehyde condensation products therein. It is an object of the present invention to obtain such uniform dispersions of aminotriazine-aldehyde resins in alkyd resins that these improved properties will be enhanced. It is a further object of my invention to provide an improved method of producing such uniformly dispersed synthetic resins. Still further objects will become apparent from the following description when taken with the claims appended hereto.

I have found that a new class of synthetic resins having the above and other important characteristics can be produced by reacting one or more organic polycarboxylic acids with a polyhydric alcohol or a mixture of polyhydric alcohols containing an incompletely polymerized aminotriazine-aldehyde condensation product dissolved therein. By first dissolving or reacting the aminotriazine-aldehyde condensation product in or with the polyhydric alcohol, or an oil-acid ester thereof, and then reacting the solution with an organic polycarboxylic acid an absolutely uniform dispersion is obtained, for I have found that the aminotriazine resin will remain dispersed in the finished alkyd resin with substantially the same molecular dispersion in which it was present in the alcohol.

It is evident that the process of my invention is perfectly general in character and can be applied to the preparation of alkyd resins of all types for formulating paints, varnishes and enamels of outstanding hardness when air-dried or baked. The process may be applied to the production of unmodified alkyd resins such as the glycerol phthalate resins, or to the lower or higher fatty acid modified, oil modified or oil acid modified alkyds, such as are now in wide commercial use. In all cases it is another important advantage of the present invention that the aminotriazine is dispersed in the alkyd resins during the formation of the latter, thereby avoiding the use of expensive solvents which would be necessary for blending if the two resins were prepared separately.

Another important advantage of the invention resides in its ready adaptability to the production of alkyd resins containing dispersions of a wide variety of aminotriazine-aldehyde condensation products. It is difficult to blend solutions of alkyd resins with some aminotriazine-aldehyde condensation products, and this is particularly true of those compounds such as hexamethylol melamine in which all of the otherwise unsubstituted amino groups of the triazine are completely saturated with alkylol or other aldehyde groups. I have found that such aminotriazine resins can be uniformly dispersed in alkyd resins in any desired ratio by simply dissolving them in an incompletely polymerized condition in the polyhydric alcohol which is to be reacted with an organic polycarboxylic acid to form an alkyd resin.

The principles of the present invention may also be employed in the production of oil modified or oil acid modified alkyd resins by the monoglyceride process, in which the glyceride oil or oil-acid is reacted with so much glycerine as to form the monoglyceride of the fatty acid or fatty acid mixture. An incompletely polymerized aminotriazine - aldehyde condensation product may be dissolved in this monoglyceride, which is then reacted with an organic polycarboxylic acid to form a resin in the usual manner. It is also possible to dissolve aminotriazine-aldehyde condensation products such as hexamethylol melamine in diglycerides of oil acids, which may then be reacted with an organic polycarboxylic acid.

Incompletely polymerized aminotriazine-aldehyde condensation products may also be dissolved in triglyceride oils by first heating them with an acidified alcohol such as butanol, ethanol, ethylene glycol or glycerine and dispersing the resulting solution in the oil. This dispersion may then be reacted with organic polycarboxylic acids and polyhydric alcohols such as phthalic anhydride and glycerine by the simultaneous process.

It is evident from what has been said that any suitable aminotriazine-aldehyde condensation product may be used in practicing the invention. However, the condensation products of melamine and its derivatives such as 2.4.6 triethyl and triphenyl triamino 1.3.5 triazines, 2.4.6 trihydrazine 1.3.5 triazine and the corresponding condensed triazines such as melam and melem appear at the present time to be of greatest immediate commercial importance, by reason of the availability of melamine and its derivatives from dicyandiamide or cyanuric chloride as raw materials, and for this reason resins containing these classes of materials constitute preferred forms of the invention. On the other hand, resins having important properties can also be obtained with triazines containing one or two reactive amino groups such as ammeline, ammelide, formoguanamine, 2 amino 1.3.5 triazine and their substitution products or from nuclear substituted aminotriazines such as 2 chloro 4.6 diamino 1.3.5 triazine, 2 phenyl 4 amino 6 hydroxy 1.3.5 triazine, 6 methyl 2.4 diamino 1.3.5 triazine and the like with lower or higher aliphatic, aromatic or heterocyclic aldehydes, and for this reason the resins prepared from aldehyde condensation products of such triazines, either singly or in admixture, are also included in the invention in its broader aspects. Any of the foregoing aminotriazines, including melamine, substituted melamines and melamine derivatives, can be condensed with any suitable aldehyde of the aliphatic, aromatic or heterocyclic series such as formaldehyde, acetaldehyde, propionaldehyde, butyraldehyde, hexaldehyde, heptaldehyde, crotonaldehyde, allylaldehyde, benzaldehyde, cinnamylaldehyde, furfural and the like to produce incompletely polymerized aminotriazine resins which can be uniformly dispersed in alkyd resins in accordance with the principles of the invention.

The condensation between the aminotriazine and the aldehyde may take place under acid, neutral or alkaline conditions, and in the presence or absence of a solvent for the incompletely polymerized reaction products, which are capable of solution or substantially homogeneous dispersion in polyhydric alcohols. These condensation products may be prepared by any suitable process and in any desired combining ratio of aldehyde to aminotriazine from 1:1 up to and including 6:1, and may be dissolved or dispersed in the polyhydric alcohol by any desired method. For example a two-stage process may be used in which the aminotriazine and aldehyde are condensed at a pH of 7 or higher and the resulting condensation product is dispersed in the alcohol at a pH of less than 6, or a one-stage process in which both the initial condensation of the aminotriazine and the aldehyde and the subsequent dispersion in alcohol are carried out at a pH of less than 6. In addition to these two methods, it is frequently possible to dissolve or disperse the initial aminotriazine-aldehyde condensation product in the alcohol at a pH of 6 or higher, and particularly within a pH range of 7.0–9.5, and this procedure may also be used in carrying into effect the principles of my invention.

As has been stated, solutions of aminotriazine-aldehyde condensation products in polyhydric alcohols may be used to replace all or part of the glycerine or other polyhydric alcohol in the preparation of any type of alkyd resin. Thus, for example, such solutions may be used in the manufacture of unmodified alkyd resins or of phthalic glyceride resins modified with non-drying oils, semi-drying oils or drying oils, or the fatty acids thereof. Similarly, they may be employed in preparing other resins of the alkyd type such as those containing polyhydric alcohol esters of aliphatic dibasic acids such as the glycol sebacates, unmodified or modified glycerol or glycol maleates or fumarates, glycerol or glycol adipates and the like. In all cases it is an important advantage of the present invention that the same methods of alkyd resin manufacture that are now in use may be employed when this substitution is made, but with corresponding improvements in the heat resistance and other properties of the finished resin.

In preparing coating compositions from the new synthetic resins which have been described, any known or approved method of formulation may be used. The resins may be used alone, or in admixture with other resins or resinophoric materials of the same or different classes such as cellulose esters or ethers including nitrocellulose, cellulose acetate, cellulose formate, cellulose butyrate or propionate, urea or thiourea formaldehyde condensation products, or thermoplastic resins such as acrylate resins, vinylite resins, polystyrene resins and the like as well as phenol-aldehyde condensation products including particularly the oil soluble condensation products of formaldehyde with alkyl phenols such as p-isopropyl or isobutyl phenol or any mixtures of these. Any suitable plasticizers or solvent softeners may be incorporated into mixtures or blends of the above described materials; thus, for example, high boiling solvents of the ester type may be used such as diethyl or dibutyl phthalate, dibutyl sebacate or ethyl or butyl lactate; solvents of the ketonone type such as ethyl or butyl benzoyl benzoate, or such substances as phthalide, sulfonamides, glycol ethers and the like. These plasticizers may be incorporated with the resinous constituents and with pigments, fillers, extenders and the like according to the usual methods of paint manufacture and may be thinned or diluted with xylene, butanol or any of the solvents and thinners now used in the paint, lacquer and varnish industries.

The invention will be illustrated in greater detail by the following specific examples. It should be understood, however, that although these examples describe certain of the more specific features of the invention they are given primarily for illustrative purposes, and that the invention in its broader aspects is not limited thereto.

EXAMPLE 1

365 parts by weight of 37% formaldehyde are neutralized with sodium hydroxide solution to a pH of 8.5, 126 parts of melamine are added, and the mixture is refluxed for 1.5–2 hours. 1200 parts of glycerol and 2 parts of 85% phosphoric acid are then added, the glycerol being introduced gradually in small amounts. The mixture is heated at about 120° C. for about one hour, or until a clear solution is obtained, after which it is dehydrated by heating with application of a vacuum.

24 parts by weight of the resulting glycerol solution are heated with 30 parts of phthalic anhydride and 34 parts of soya fatty acids at 220° C. until a resin having an acid number of less than 10 is obtained. This resin is well suited for the formulation of baking enamels.

For example, when 200 parts of a 50% solution of the resin in xylene are ground with 25 parts of Prussian blue pigment and 60 parts of a thinner are added an enamel is obtained which is well suited for spray application to bare sheet steel, bonderized steel or over a priming coat. When baked for one hour at 225° F. it produces a hard, glossy film of excellent water resistance. For air drying enamels .05 to .10 part of cobalt per 100 parts solid resin and .1 to .2 part of lead should be added as naphthenate or linoleate drier and the enamel should be aged for several days to develop gloss and drying speed. Smaller amounts of driers may be added to the baked enamels if desired.

This resin is also compatible with nitrocellulose and may be incorporated therewith for the production of clear or pigmented lacquers. For example, 150 parts of a 50% xylene solution of the resin may be mixed with 100 parts of dry nitrocellulose and 10 parts of dibutyl phthalate A clear furniture lacquer is obtained which may be thinned to spraying consistency with the usual lacquer solvents.

EXAMPLE 2

126 parts by weight of melamine are suspended in 486 parts by weight of 37% formaldehyde which has been adjusted to a pH of 9.0 with sodium hydroxide. The mixture is then agitated at 25° C. for approximately 6 hours, after which time the initial condensation is substantially complete and a thick slurry of hexamethylol melamine is obtained.

This slurry may be spray dried at temperatures below 260° F. or it may be dried by any other suitable means which retains the hexamethylol melamine in an incompletely polymerized condition. 4 parts by weight of the dried material are then heated for a short time at 150° C. with 20 parts of glycerine until a clear solution is obtained, after which 30 parts of phthalic anhydride and 34 parts of soya fatty acids are added. The mixture is heated at 220-230° C. as in Example 1 until a resin having an acid number or less than 10 is obtained. This resin is similar to that produced by the processes of Example 1 and possesses similar characteristics.

EXAMPLE 3

300 parts of hexamethylol melamine are dissolved in 1270 parts of 98% C. P. glycerine. 1465 parts of phthalicanhydride and 1220 parts of benzoic acid are added and the batch is heated to 220-230° C. until resin formation is complete. The resulting resin possesses a very low acid number and correspondingly good water resistance, and is highly resistant to heat by reason of its melamine-aldehyde resin content.

EXAMPLE 4

324 parts of unneutralized 37% formaldehyde solution having a pH of 3.0-3.5 and 126 parts of melamine are refluxed together until a solution of tetramethylol melamine is formed. 655 parts of diethylene glycol and 1 part of 85% phosphoric acid are added and the heating is continued with distillation of water until a clear and preferably dehydrated solution is obtained.

This solution is charged into a resin kettle together with 1756 parts of phthalic anhydride, 510 parts of 98% C. P. glycerine and 1440 parts of coconut oil and the mixture is heated while a vigorous current of carbon dioxide or nitrogen is passed through it to exclude oxygen. The heating is continued at 200-230° C. until a resin having an acid number of 10-15 is obtained.

The resulting resin is well suited for admixture with nitrocellulose in the production of clear or pigmented nitrocellulose varnishes and enamels.

EXAMPLE 5

284 parts of 37% formaldehyde solution are adjusted to a pH of 7.5 by the addition of triethanolamine and 960 parts of glycerine are added. 126 parts of melamine are then introduced and the mixture is heated at 100-110° C. for one-half hour. 2 parts of 85% phosphoric acid or equivalent amounts of phthalic, maleic or fumaric acids are added and the mixture is heated until a clear solution is obtained. Water is then removed by further heating and distillation, preferably under a vacuum, and a solution or dispersion of the incompletely polymerized methylol melamine in glycerine is finally obtained.

1640 parts of phthalic anhydride, 1104 parts of linseed fatty acids, 1104 parts of refined linseed oil and 552 parts of castor oil are mixed with the above described glycerine solution and the mixture is heated to 200-230° C. and held at this temperature for about 2-3 hours. The batch is then cooled and poured, and should have an acid number of 6-9.

This resin is well suited for the preparation of clear finishes for air-drying and baking, and for undercoats and enamels in any desired color for automobiles, metal furniture and the like. It is particularly well suited for use in the preparation of pigmented lacquers of good through-hardening and weather-resisting properties as it can be used as a grinding vehicle for a wide variety of pigments. An example of such a lacquer is the following:

Green enamel

| | Parts |
|---|---|
| 50% solution of the resin in xylene | 200 |
| Lamp black | 3 |
| Barytes | 3 |
| Chrome Orange | 4 |
| Chrome Yellow Dark | 4 |
| Zinc drier | 1 |
| Thinner | 65 |

This lacquer is well suited for direct application to sheet metal, wood, steel, iron, die cast zinc and the like. When baked on any of these surfaces for 40 minutes at 250° F. or for 20 minutes at 300° F. it forms a hard, tough film of good gloss and excellent weather resistance.

EXAMPLE 6

130 parts by weight of hexamethylol melamine are dissolved by heating in 700 parts of glycerine and 1040 parts of phthalic anhydride and 1200 parts of soya fatty acids are added. The mixture is heated to about 180-220° C. and held at this temperature for an acid number of 6-8, after which it is cooled and poured.

This resin is especially well adapted for the production of refrigerator type enamels. A representative white enamel of this class has the following formulation.

| | Parts |
|---|---|
| 50% solution of the resin in xylene | 200 |
| Titanium dioxide | 95 |
| Zinc oxide | 5 |
| Thinner | 100 |

The pigments are preferably ground into the resin solution in a paint mill and the thinner is added. Cobalt and lead driers may be added in small amounts (0.02% and 0.4% respectively) when lower baking schedules are employed, although they may be entirely omitted when using the high baking temperatures made possible by the presence of the melamine-formaldehyde resin. Thus, for example, the resin-pigment grind of the composition described may be thinned to spraying consistency with a mixture of equal parts of xylene and butanol and sprayed on bare sheet steel surfaces, or over a primer, and baked at 250° F. for 30 minutes or at 310° F. for 15 minutes. The resulting coat has a high gloss and good color retention, upon exposure to light.

The resin may also be used in admixture with urea-formaldehyde resins in the production of baking enamels. A satisfactory formulation is the following:

|   | Parts |
|---|---|
| 50% solution of the resin in xylene | 150 |
| 50% urea-formaldehyde resin solution in butanol | 50 |
| Toluidine Red toner | 20 |
| Butanol | 10 |
| Coal tar naphtha, to spraying consistency. | |

EXAMPLE 7

486 parts of 37% formaldehyde are neutralized with sodium hydroxide to a pH of 8.0 and 127 parts of ammeline (2 hydroxy 4.6 diamino 1.3.5 triazine) are added. The mixture is refluxed for 2-3 hours, after which 1050 parts of glycerine are added together with sufficient phosphoric acid or maleic acid to neutralize the free alkali. The heating is then continued for one-half hour, after which the free water is distilled off.

2072 parts of phthalic anhydride, 1420 parts of linseed fatty acids and 1045 parts of refined linseed oil are then added and the mixture is reacted at 220° C. to an acid number of 50-60. It is then cooled and dissolved in xylene or other suitable solvents if desired.

This resin is well suited for use in the formulation of clear and pigmented enamels, as described in preceding examples.

EXAMPLE 8

One mole of 2.4 diamino 1.3.5 triazine is heated with 3 moles of 37% formaldehyde solution for about 4 hours, or until a clear solution is obtained. 705 parts of glycerine are then added and the mixture is dehydrated by heating under a vacuum until all the water is distilled off.

455 parts of maleic anhydride and 3300 parts of X gum rosin are added to the glycerine solution and the mixture is heated at 220° C. until the acid number is below 40. The resulting resin is well suited for varnish making and can be cooked into linseed oil, tung oil, China-wood oil and the like.

What I claim is:

1. A method for the production of synthetic resins which comprises dissolving an incompletely polymerized aminotriazine-aldehyde condensation product in a solvent selected from the group consisting of glycerine and higher fatty acid mono-glycerides and reacting the solution with phthalic anhydride at temperatures above 180° C. until a resin of low acid number is obtained.

2. A method for the production of synthetic resins which comprises dissolving an incompletely polymerized melamine-aldehyde condensation product in a solvent selected from the group consisting of polyhydric alcohols and higher fatty acid mono-esters of glycerol and reacting the solution with an organic polycarboxylic acid at temperatures above 180° C. until a resin of low acid number is obtained.

3. A method for the production of synthetic resin which comprises dissolving an incompletely polymerized melamine-aldehyde condensation product in a solvent selected from the group consisting of glycerine and higher fatty acid monglycerides and reacting the solution with an organic polycarboxylic acid at temperatures above 180° C. until a resin of low acid number is obtaned.

4. A method for the production of synthetic resins which comprises reacting an organic polycarboxylic acid and a member of the group consisting of glyceride oils and the fatty acids thereof with a polyhydric alcohol containing an incompletely polymerized aminotriazine-aldehyde condensation product dissolved therein at temperatures above 180° C. until a resin of low acid number is obtained.

5. A method for the production of synthetic resins which comprises reacting an organic polycarboxylic acid and a member of the group consisting of glyceride oils and the fatty acids thereof with a polyhydric alcohol containing an incompletely polymerized melamine-aldehyde condensation product dissolved therein at temperatures above 180° C. until a resin of low acid number is obtained.

6. A synthetic resin of low acid number comprising the reaction product of an organic polycarboxylic acid and a member of the group consisting of glyceride oils and the fatty acids thereof with a solution of an incompletely polymerized melamine-aldehyde condensation product in a polyhydric alcohol at temperatures above 180° C.

7. A method for the production of synthetic resins which comprises dissolving an incompletely polymerized aminotriazine-aldehyde condensation product in an alcohol and heating it in admixture with an organic polycarboxylic acid, a polyhydric alcohol and a higher fatty acid ester of glycerol at temperatures above 180° C. until a resin of low acid number is obtained.

8. A method for the production of synthetic resins which comprises dissolving an incompletely polymerized aminotriazine-aldehyde condensation product in a polyhydric alcohol, adding an organic polycarboxylic acid and heating at temperatures above 180° C. until a resin of low acid number is obtained.

9. A method for the production of synthetic resins which comprises dissolving an incompletely polymerized melamine-aldehyde condensation product in glycerine, adding an organic polycarboxylic acid and heating at temperatures above 180° C. until a resin of low acid number is obtained.

10. A synthetic resin comprising the product obtained by dissolving an incompletely polymerized aminotriazine-aldehyde condensation product in an alcohol and heating it in admixture with an organic polycarboxylic acid, a polyhydric alcohol and a higher fatty acid ester of glycerol at temperatures above 180° C. until a resin of low acid number is obtained.

11. A synthetic resin comprising the product obtained by dissolving an incompletely polymerized aminotriazine-aldehyde condensation product in a polyhydric alcohol, adding an organic polycarboxylic acid and heating at temperatures above 180° C. until a resin of low acid number is obtained.

12. A synthetic resin comprising the product obtained by dissolving an incompletely polymerized melamine-aldehyde condensation product in a polyhydric alcohol, adding an organic polycarboxylic acid and heating at temperatures above 180° C. until a resin of low acid number is obtained.

HERBERT J. WEST.